(12) United States Patent
Velusamy et al.

(10) Patent No.: US 9,369,592 B1
(45) Date of Patent: Jun. 14, 2016

(54) ACCURATE USER DATA INFORMATION

(71) Applicant: Sprint Communications Company L.P., Overland Park, KS (US)

(72) Inventors: Saravana Velusamy, Olathe, KS (US); Suryanarayanan Ramamurthy, Olathe, KS (US); Rajat Kumar, Woodbridge, IL (US); Talat Jamshidi, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 235 days.

(21) Appl. No.: 14/176,373

(22) Filed: Feb. 10, 2014

(51) Int. Cl.
*H04L 12/28* (2006.01)
*H04M 17/00* (2006.01)
*H04W 4/24* (2009.01)

(52) U.S. Cl.
CPC ............... *H04M 17/10* (2013.01); *H04W 4/24* (2013.01)

(58) Field of Classification Search
CPC .......... H04W 4/24; H04W 4/26; H04L 12/14; H04L 12/1403; H04L 12/1407; H04L 12/1467
See application file for complete search history.

(56) References Cited

U.S. PATENT DOCUMENTS

| | | | |
|---|---|---|---|
| 2011/0075675 A1 | 3/2011 | Koodli et al. | |
| 2013/0031231 A1* | 1/2013 | Li | H04L 12/6418 709/223 |
| 2014/0189790 A1* | 7/2014 | Mindler | H04L 67/02 726/3 |

* cited by examiner

*Primary Examiner* — Kan Yuen

(57) ABSTRACT

Examples disclosed herein provide systems, methods, and software for responding to data balance queries for a wireless device. In one example, a method of operating a communication system includes initiating a data balance query for a wireless device and transferring the query to a packet data network gateway. In response to the query, the packet data network gateway and an online charging server are configured to transfer data usage information to a prepaid management system. In turn, the prepaid management module is configured to update the account for the wireless device based on the data usage information, and provide a data balance response to the wireless device.

9 Claims, 4 Drawing Sheets

ACCURATE USER DATA INFORMATION

TECHNICAL BACKGROUND

Wireless communication systems typically include wireless access systems with equipment such as wireless access nodes, along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless devices, service providers, and other end user devices. The user communications typically include voice calls, data exchanges, web pages, streaming media, or text messages, among other communication services.

In some examples, an online charging server or OCS may monitor the data connections for the wireless devices. The OCS is a system that allows communication service providers to charge their customers, in real time, based on service usage. To accomplish this task, the wireless communication must be consistently monitored to ensure that the user is permitted to use the requested amount of data. If the user is out of data, then the OCS can be used to terminate the communication and prevent the device from joining the network.

Further, in some instances, the OCS may be connected to a prepaid management system that defines data information for the end user. These prepaid management systems allow the users to manage their accounts by adding data or checking the balance remaining on the prepaid plan. Accordingly, a user may rely on the information provided by the prepaid system to ensure that data connections are available.

OVERVIEW

Examples disclosed herein provide systems and methods for accurate data balance accounts for wireless communication devices. In one example, a method of operating a communication system includes, in a packet data network gateway, receiving a balance query for a wireless communication device, and transferring data usage information for the wireless communication device to an online charging server. The method further includes, in the online charging server, receiving the data usage information and transferring aggregated data information to a prepaid management system based on the data usage information and supplemental data usage information. The method also includes, in the prepaid management system, receiving the aggregated data information and generating an updated balance for the wireless communication device. The method further provides, in the packet data network gateway and following the generation of the updated balance, transferring the balance query to the prepaid management system.

In another instance, a system for account balance queries includes a packet data network gateway configured to receive a balance query from a wireless communication device, and hold the balance query until an updated balance is generated for the wireless communication device at a prepaid management system. The packet data network gateway is further configured to transfer data usage information to an online charging server and, upon generation of the updated balance, transfer the balance query to the prepaid management system. The system further includes the online charging server configured to receive the data usage information, and transfer aggregated data information to the prepaid management system based on the data usage information and supplemental data usage information. The system also includes the prepaid management system configured to receive the aggregated data information, and generate the updated balance based on the aggregated data information.

In a further example, a method of operating a packet data network gateway includes receiving a balance query from a wireless communication device and, in response to the balance query, transferring data usage information to an online charging server to generate an updated data balance in a prepaid management system. The method further includes, upon generation of the updated data balance, transferring the balance query to the prepaid management system.

BRIEF DESCRIPTION OF THE DRAWINGS

Many aspects of the disclosure can be better understood with reference to the following drawings. The components in the drawings are not necessarily to scale, emphasis instead being placed upon illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless devices provide a variety of applications to users that require data communications using wireless networks. These applications may include voice applications, email applications, gaming applications, file sharing applications, or a variety of other applications. When a communication is required, the wireless device may communicate with a wireless access node that will in turn communicate to a packet data network gateway or PGW. Once the requested communication is identified, the PGW may request an online charging server (OCS) for a data quota for the user device.

In some examples, the PGW will periodically query the online charging server for quota information. During these queries, the online charging server returns that a predetermined quota of data still remains on the user account. Once the device uses this quota, the PGW may again query the charging server for another quota. This process may repeat as many times as necessary until the communication is completed, or the user device exhausts the allotted amount of data in the charging server.

In addition to an online charging server, a wireless system may also include a prepaid management server that allows a user to check and manage the amount of data on the user's account. This account information may be periodically updated by the online charging server based on the actual amount of data used by the wireless device.

In the present example, the online charging server may further update the prepaid management system upon a balance query for a user device. To accomplish this task, the user may transfer an account balance query to the packet data network gateway. The packet data network gateway is configured to hold query, and transfer data usage information to the online charging server indicating an amount of data that the user has remaining. Once the information is at the online charging server, the OCS is configured to transfer aggregated data information to the prepaid management system based on the data usage information and supplemental data usage information. Together, this aggregated data usage information allows the prepaid management system to more accurately represent the amount of data remaining or used in the device's account. As a result, once the account is updated, the packet data network may forward the balance query to the prepaid management system to retrieve the account balance for the wireless device.

Figure 1:
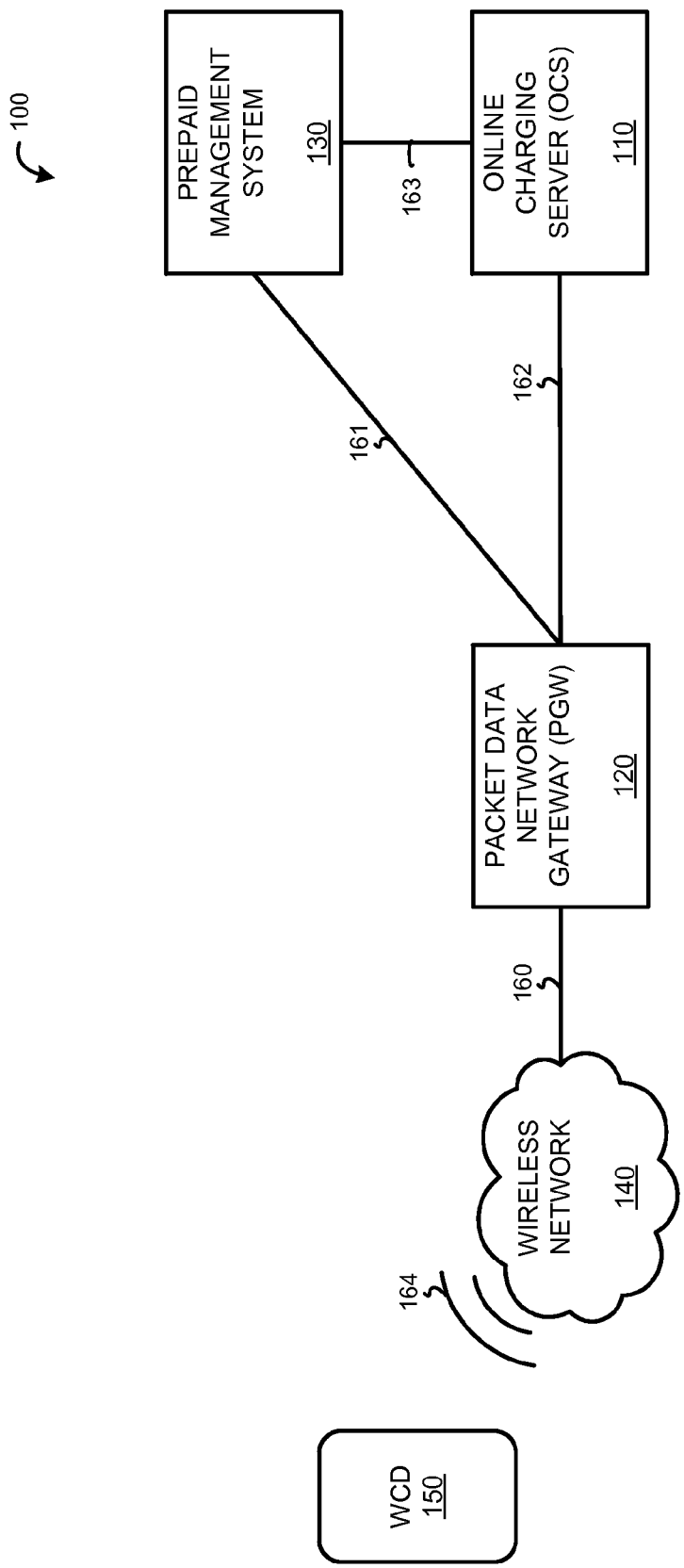
FIG. 1 illustrates a communication system for responding to data balance queries.

Referring now to FIG. 1, FIG. 1 illustrates a wireless system 100 for updating a prepaid management system based on a user account query. Wireless system 100 includes online charging server (OCS) 110, packet data network gateway (PGW) 120, prepaid management system 130, wireless network 140, and wireless communication device (WCD) 150. Wireless network 140 provides wireless communication over communication sector 164 to WCD 150. PGW 120 is configured to communicate with wireless network 140 over communication link 160, and is further configured to communicate with prepaid management system 130 and OCS 110 over communication links 161-162. Prepaid management system 130 is configured to communicate with OCS 110 over communication link 163.

In operation, WCD 150 includes a variety of applications that wirelessly communicate data with servers and other devices. To manage the data communications, WCD 150 may have an account that specifies that amount of data the device is allowed to communicate. Accordingly, the account may reflect the current amount of data consumed by the wireless device, the current amount of data still available to the wireless device, or any other relevant information about the data available to WCD 150.

In some examples, it may be beneficial for the user to monitor the amount of data used by the wireless device. As a result, WCD 150 may include an application or function that allows the user to query prepaid management system 130 to determine the status of their account. In response, the wireless system is configured to gather the usage data from PGW 120 and OCS 110 and provide the user with an accurate representation of the data usage.

Figure 2:
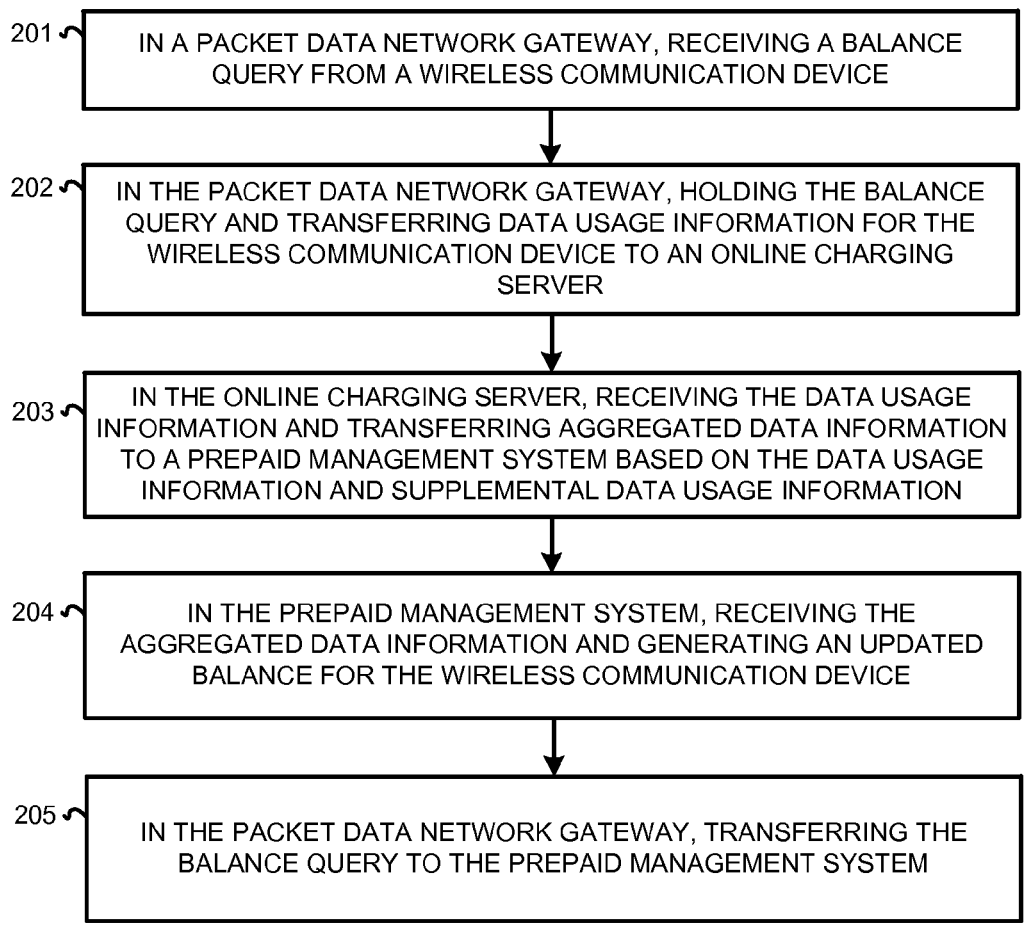
FIG. 2 illustrates a method of operating a communication system to respond to data balance queries.

To further illustrate the operation of wireless system 100, FIG. 2 is included. FIG. 2 illustrates a method of operating a wireless system to provide accurate account information for a wireless communication device. In operation, WCD 150 may initiate a balance query to determine the amount of data available to the wireless device (201). PGW 120 is configured to receive the request and hold the request while accurate data usage information is gathered for WCD 150 (202).

In some examples, prepaid management system 130 may be configured to periodically update user accounts based on data usage registered in OCS 110. During data communications, PGW 120 is configured to query OCS 110 to determine if data is available to handle a communication for the wireless device. In response to the query, OCS 110 takes a portion or fraction of the data available to the device and returns the portion to PGW 120 as a data quota for the wireless device. As a result of the quota, the device is allowed to communicate until the quota is used or expired, at which point the query process may be repeated until either no data is available or the communication is complete. Due to the constant communication between OCS 110 and PGW 120, prepaid management system 130 may not accurately represent the data used or remaining in the user's account at the time of the balance query.

Consequently, PGW 120 is configured to gather data usage information about WCD 150 and transfer the data to OCS 110. This data usage information includes any remaining data from the last quota request, or any other relevant data usage information. Once OCS 110 receives the data, OCS 110 is further configured to gather supplemental data usage information that reflects the amount of data available to WCD 150 on OCS 110, and transfer an aggregated update to prepaid management system 130 based on the data usage information with the supplemental data usage information (203).

Prepaid management system 130 is configured to receive the aggregated update and generate an updated balance for the user based on the information provided (204). Once the balance is updated, PGW 120 may remove the hold on the balance query and allow the query to proceed to prepaid management system 130 (205). This allows an up-to-date and accurate reflection of the user account to be returned to the user of the wireless device.

Figure 3:
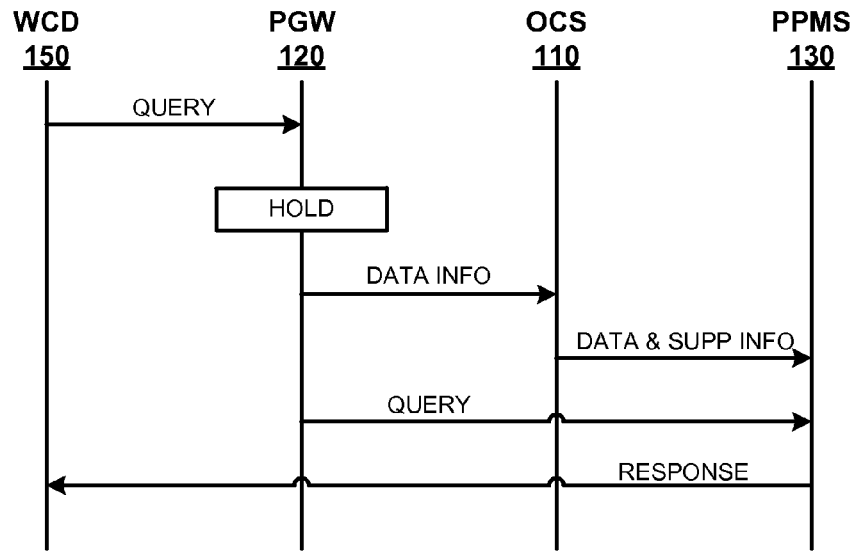
FIG. 3 illustrates a timing diagram for responding to data balance queries.

Turning now to FIG. 3, FIG. 3 illustrates a timing diagram for updating a device account in response a balance query. As illustrated, WCD 150 may request to view account balance information regarding the amount of data available for the device. This query is communicated over a wireless network to PGW 120, where the request is held while an accurate balance is determined.

To establish the accurate balance, PGW 120 is configured to transfer data usage information to OCS 110 that comprises the remaining amount of data from a quota supplied by OCS 110. A quota is a portion or fraction of the total amount of data that allows a device to communicate using the wireless communication network. When a communication is required, PGW 120 is configured to make a quota query to OCS 110, which will in turn supply a portion of the data for the communication. If the quota is not enough, PGW 120 may make subsequent queries until the device has used all of the available data or the communication is complete.

Once OCS 110 receives the data usage information, OCS 110 is configured to determine supplemental data usage information that indicates the amount of data still available for the wireless device from the OCS. Upon determination, an aggregated response is transferred to prepaid management system 130 based on the data usage information and supplemental data usage information. This information may then be used to update the available data balance to the end user.

Further, once the aggregated update is transferred to prepaid management system 130, PGW 120 may remove the hold on the balance query and forward the query to prepaid management system 130. In response to the query, prepaid management system 130 will determine a balance response and transfer the response to WCD 150. This response may include a variety of information including the amount of data that remains, the amount of data that has been used, or any other relevant statistic based on the data balance.

Figure 4:
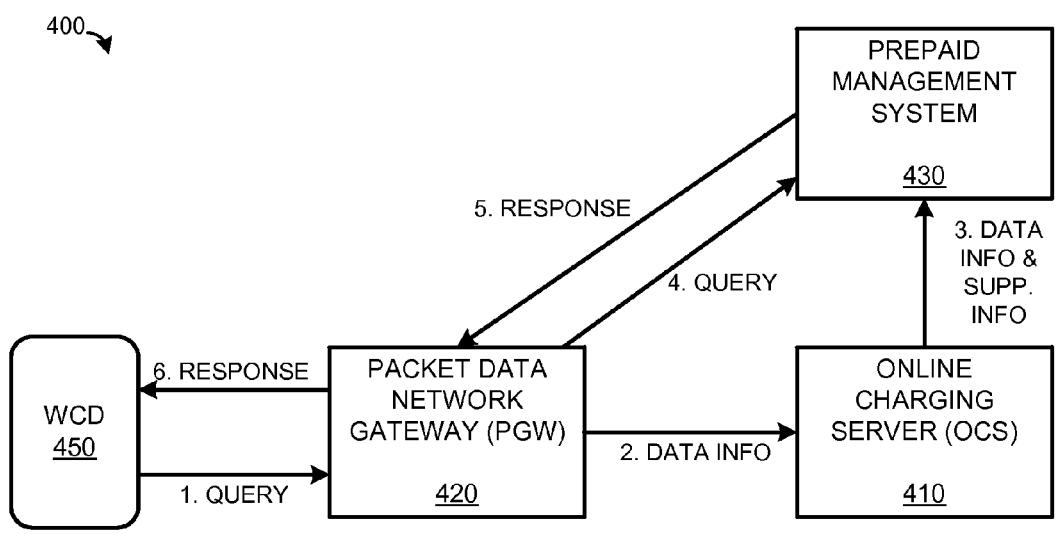
FIG. 4 illustrates an overview for responding to data balance queries.

FIG. 4 illustrates an overview 400 for updating data balances in wireless communication system. Overview 400 includes wireless communication device (WCD) 450, packet data network gateway (PGW) 420, online charging server (OCS) 410, and prepaid management system 430.

In operation, WCD 450 may provide a user with a variety of applications that require data communications. To make these communications, the device is first approved or authorized by PGW 420. This authorization is accomplished using a Gy interface between PGW 420 and OCS 410. Once PGW 420 recognizes a communication, PGW 420 will transfer a quota request to OCS 410 to retrieve a data quota for the wireless device. In turn, OCS 410 will identify a segment or portion of the total data available to the device and transfer the portion to PGW 420 in the form of a quota response. This process may be repeated as many times as necessary to provide the data for the wireless communication.

Also in the communication system, prepaid management system 430 is configured to allow a user to monitor and manage data information about a wireless communication device. This data information may include the amount of data that is still available to the wireless device, the amount of data that has been used by the wireless device, or any other relevant information about the usage of the wireless device. In some examples, prepaid management system 430 may be periodically updated by OCS 410 with the amount of data that has been used by the wireless device. As a result of the periodic updates, at any given time, prepaid management system 430 may not reflect the actual amount of data that has been used by the wireless device.

Referring still to FIG. 4, WCD 450 may wish to gather an account balance that accurately reflects the amount of data that has been used by the wireless device. To accomplish this task, WCD 450 is configured to transfer an account balance query across the wireless network to PGW 420. In response to the account query, PGW 420 is configured to hold the query and determine data usage information for the wireless device. This data usage information may include the amount of data remaining from a data quota for the wireless device, or any other relevant data information about the wireless device. Once the information determined, PGW 420 is configured to pass this data to OCS 410.

In response to the data usage information, OCS 410 is configured to determine supplemental data usage information to combine with the data usage information as an aggregated response. This supplemental information may comprise the amount of data that the wireless device has available according to OCS 410. Once the aggregated response is determined, the response may be passed to prepaid management system 430 to update the user account.

Once the account has been updated via the data usage information from PGW 420 and OCS 410, PGW 420 is configured to remove the hold on the account balance query. Accordingly, the query is passed to prepaid management system 430, which returns accurate information regarding the data usage of WCD 450. The response from prepaid management system 430 may include the amount of data remaining in the device account, the amount of data that has been used by the device, or any other relevant account balance information.

Figure 5:
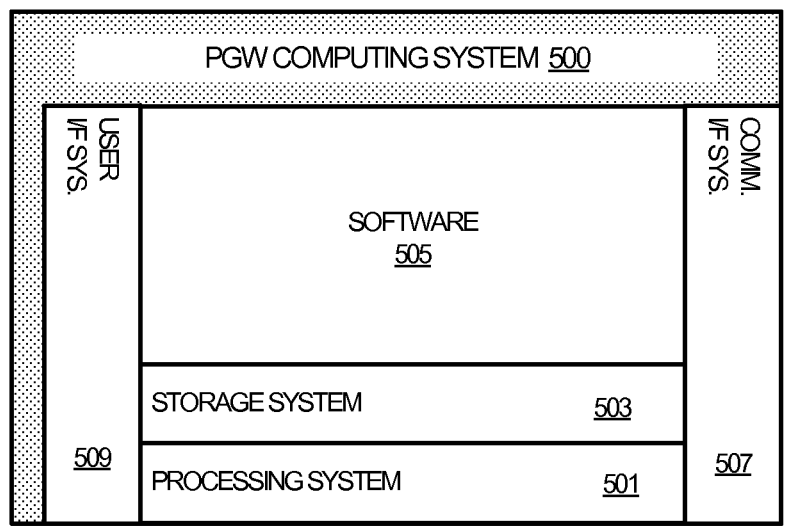
FIG. 5 illustrates a packet data network computing system for managing data balance queries.

Turning now to FIG. 5, FIG. 5 illustrates a PGW computing system 500 for managing data balance queries. PGW computing system 500 is representative of a computing system that may be employed in any computing apparatus, system, or device, or collections thereof, to suitably implement PGW 120 or PGW 420. Computing system 500 may be employed in server computers, desktop computers, or any other similar computing device.

Computing system 500 includes processing system 501, storage system 503, software 505, communication interface system 507, and user interface system 509. Processing system 501 is operatively coupled with storage system 503, communication interface system 507, and user interface system 509. Processing system 501 loads and executes software 505 from storage system 503. When executed by processing system 501, software 505 directs processing system 501 to operate as described herein as a packet data network gateway to manage data balance queries from user devices. Computing system 500 may optionally include additional devices, features, or functionality not discussed here for purposes of brevity.

Referring still to FIG. 5, processing system 501 may comprise a microprocessor and other circuitry that retrieves and executes software 505 from storage system 503. Processing system 501 may be implemented within a single processing device, but may also be distributed across multiple processing devices or sub-systems that cooperate in executing program instructions. Examples of processing system 501 include general-purpose central processing units, application specific processors, and logic devices, as well as any other type of processing device, combinations, or variation.

Storage system 503 may comprise any computer readable storage media readable by processing system 501 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 503 may also include communication media over which software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 501 or possibly other systems.

Software 505 may be implemented in program instructions and among other functions may, when executed by processing system 501, direct processing system 501 to operate as a PGW described herein by FIGS. 1-4. In particular, the program instructions may include various components or modules that cooperate or otherwise interact to carry out the balance query management operations described in FIGS. 1-4. The various components or modules may be embodied in compiled or interpreted instructions, or in some other variation or combination of instructions. The various components or modules may be executed in a synchronous or asynchronous manner, in a serial or in parallel, in a single threaded environment or multi-threaded environment, or in accordance with any other suitable execution paradigm, variation, or combination thereof. Software 505 may include additional processes, programs, or components, such as operating system software, hypervisor software, or other application software. Software 505 may also comprise firmware or some other form of machine-readable processing instructions executable by processing system 501.

For example, if the computer-storage media are implemented as semiconductor-based memory, software 505 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a system on which software 505 may be deployed and executed in order to implement a PGW system from FIGS. 1-4 (or variations thereof). However, computing system 500 may also be suitable for any computing system on which software 505 may be staged and from where software 505 may be distributed, transported, downloaded, or otherwise provided to yet another computing system for deployment and execution, or yet additional distribution.

In one example, a wireless device may initiate a data balance query that passes over a wireless network to computing system 500. This query allows the device to view balance related information, including the amount of data remaining on the account, the amount of data that has been used on the account, or any other information on the account. To accommodate the request and to gather the most accurate data information for the device, computing system 500 is configured to hold the query until the account can be updated with the most recent data use information.

In a typical communication operation for a wireless device, computing system 500 is configured to gather data quotas or portions of the total data available to the device from an online charging server. This quota gathering may be repeated as many times as necessary until the device completes the communication, or has exhausted the available data.

To ensure a proper account balance, PGW computing system 500 is configured to gather data usage information and pass the usage information to the online charging server while the balance query is on hold. This data usage information may include at least an amount of data remaining from a data quota supplied by the online charging server. For example, if the online charging server provides a two megabyte data quota and one megabyte remains, the data usage information may comprise the remaining one megabyte from the quota.

Once delivered, the online charging server is configured to gather supplemental information and provide aggregated data information to the prepaid management system. This aggregated information allows the prepaid management system to update the device account based on the most recent data usage by the wireless device. Further, once the account is updated, computing system 500 is configured to remove the hold on the data balance query and transfer the query to the prepaid management system using communication interface system 507. PGW computing system 500 is also configured to receive a balance response from the prepaid management system and provide the response to the corresponding wireless device.

Referring still to FIG. 5, communication interface system 507 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 509, which may be omitted in some examples, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here. User interface system 509 may also include associated user interface software executable by processing system 501 in support of the various user input and output devices discussed above. Separately, or in conjunction with each other and other hardware and software elements, the user interface software and devices may support a graphical user interface, a natural user interface, or any other suitable type of user interface.

Returning to FIG. 1, online charging server (OCS) 110 may comprise any physical or virtual computing system with the ability to determine actual and default quota information for wireless devices. OCS 110 may include processing systems, user interfaces, communication interfaces, storage systems, or other similar computing elements.

PGW 120 may comprise any computing devices capable of acting as a gateway between the wireless network and the other packet data networks, such as the Internet or SIP-based IMS networks. PGW 120 may include processing systems, user interfaces, communication interfaces, storage systems, or other similar computing elements. In particular, PGW 120 may include elements to provide WCD 150 with accurate data account balance information.

Prepaid management system 130 is configured to manage wireless account information and to allow the wireless devices to view this information. Prepaid management system 130 may include processing systems, user interfaces, communication interfaces, storage systems, or other similar computing elements.

Wireless network 140 is configured to provide communication services to various wireless devices using Long Term Evolution (LTE), Code Division Multiple Access (CDMA), Evolution Data Only (EVDO) or some other wireless communication format. Wireless network 110 may comprise switches, access nodes, Internet routers, network gateways, application servers, computer systems, communication links, or some other type of communication equipment—including combinations thereof.

Communication links 160-163 use metal, glass, air, space, or some other material as the transport media. Communication links 160-163 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 160-163 could be direct links or may include intermediate networks, systems, or devices.

Communication sector 164 includes wireless links that use the air or space as a transport media. These wireless links may communicate using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system for data balance queries comprises:
   in a packet data network gateway, receiving a balance query from a wireless communication device;
   in the packet data network gateway and in response to the balance query, transferring data usage information for the wireless communication device to an online charging server, wherein the data usage information comprises a quantity of data remaining from a data quota, the data quota comprising a portion of total data available to the wireless communication device supplied by the online charging server;
   in the online charging server, receiving the data usage information and transferring aggregated data information to a prepaid management system based on the data usage information and supplemental data usage information for the wireless communication device;
   in the prepaid management system, receiving the aggregated data information and generating an updated balance for the wireless communication device based on the aggregated data information;
   in the packet data network gateway, transferring the balance query to the prepaid management system; and
   in the prepaid management system, receiving the balance query and, after the generation of the updated balance for the wireless communication device, transferring a balance response to the wireless communication device based on the updated balance.

2. The method of claim 1 wherein the supplemental data usage information comprises a quantity of data remaining for the wireless communication device in the online charging server.

3. The method of claim 1 wherein the updated balance comprises a total amount of data available to the wireless communication device.

4. The method of claim 1 wherein the balance query comprises a user initiated query on the wireless communication device.

5. A system for account balance queries comprising:
   a packet data network gateway configured to:
      receive a balance query from a wireless communication device;
      in response to the balance query, transfer data usage information to an online charging server for the wireless communication device, wherein the data usage information comprises a quantity of data remaining from a data quota, the data quota comprising a portion of total data available to the wireless communication device supplied by the online charging server; and
      transfer the balance query to the prepaid management system;
   the online charging server configured to:
      receive the data usage information from the packet data network gateway; and
      transfer aggregated data information to the prepaid management system based on the data usage information and supplemental data usage information for the wireless communication device; and
   the prepaid management system configured to:
      receive the aggregated data information from the online charging server;
      generate the updated balance based on the aggregated data information;
      receive the balance query from the packet data network gateway and, in response to the generation of the updated balance for the wireless communication device, transfer a balance response for delivery to the wireless communication device based on the updated balance.

6. The system of claim 5 wherein the supplemental data usage information comprises a quantity of data remaining for the wireless communication device in the online charging server.

7. The system of claim 5 wherein the balance query comprises a user initiated query on the wireless communication device.

8. A method of operating a packet data network gateway comprising:
   receiving a balance query from a wireless communication device;
   in response to the balance query, transferring data usage information to an online charging server to generate an updated data balance in a prepaid management system, wherein the data usage information comprises a quantity of data remaining from a data quota, the data quota comprising a portion of total data available to the wireless communication device supplied by the online charging server;
   transferring the balance query to the prepaid management system;
   receiving, from the prepaid management system, a balance response based on the updated balance, wherein the updated balance comprises a new balance based on the data usage information and supplemental data usage information from the online charging server; and
   transferring the balance response to the wireless communication device.

9. The method of claim 8 wherein the balance query comprises a request to determine the amount of data remaining available for use by the wireless communication device.

* * * * *